United States Patent [19]
Dodson et al.

[11] 4,408,751
[45] Oct. 11, 1983

[54] MULTI-CHAMBER TEMPERATURE COMPENSATED PNEUMATIC COUNTERBALANCE

[75] Inventors: Daniel P. Dodson, Florence; George C. Ludwig, Marion, both of S.C.

[73] Assignee: AVM Corporation, Jamestown, N.Y.

[21] Appl. No.: 256,997

[22] Filed: Apr. 24, 1981

[51] Int. Cl.³ .............................................. F16F 9/02
[52] U.S. Cl. .................... 267/120; 267/64.11; 267/64.25; 188/277
[58] Field of Search ............... 188/276, 277, 279, 313, 188/315, 317; 267/64.11, 64.25, 120, 121, 126, 127, 64.15; 137/468; 236/93 R, 93 A

[56] References Cited
U.S. PATENT DOCUMENTS

| | | | |
|---|---|---|---|
| 2,471,655 | 5/1949 | Rundell | 236/93 R |
| 2,833,379 | 5/1958 | Matthews et al. | 267/64.11 |
| 2,971,212 | 2/1961 | Vöster et al. | 267/121 |
| 2,989,299 | 6/1961 | Modrich | 267/127 |
| 3,163,262 | 12/1964 | Allinquant | 267/64.11 |
| 4,030,715 | 6/1977 | Duran | 188/317 |

FOREIGN PATENT DOCUMENTS

| | | | |
|---|---|---|---|
| 2051858 | 5/1972 | Fed. Rep. of Germany . | |
| 2460219 | 7/1975 | Fed. Rep. of Germany | 137/468 |
| 2460267 | 7/1975 | Fed. Rep. of Germany | 137/468 |
| 54-57077 | 5/1979 | Japan | 188/276 |

Primary Examiner—Douglas C. Butler
Assistant Examiner—R. R. Diefendorf
Attorney, Agent, or Firm—LeBlanc, Nolan, Shur & Nies

[57] ABSTRACT

A pneumatic, piston/cylinder counterbalance in which the counterbalance force is obtained by differential pressure across the piston and in which the force changes due to temperature are compensated by use of a variable volume cylinder having one or more auxiliary chambers separated by walls, each including a temperature responsive bi-metal disc valve normally acting as a check valve permitting flow into the auxiliary chambers but preventing flow out of the chambers except when the temperature drops to a predetermined value. In the multiple auxiliary chamber embodiment, flow into and out from each chamber is controlled by an associated bi-metal disc valve responsive to successively lower temperatures to enable a more linear stabilization of force output regardless of temperature.

36 Claims, 9 Drawing Figures

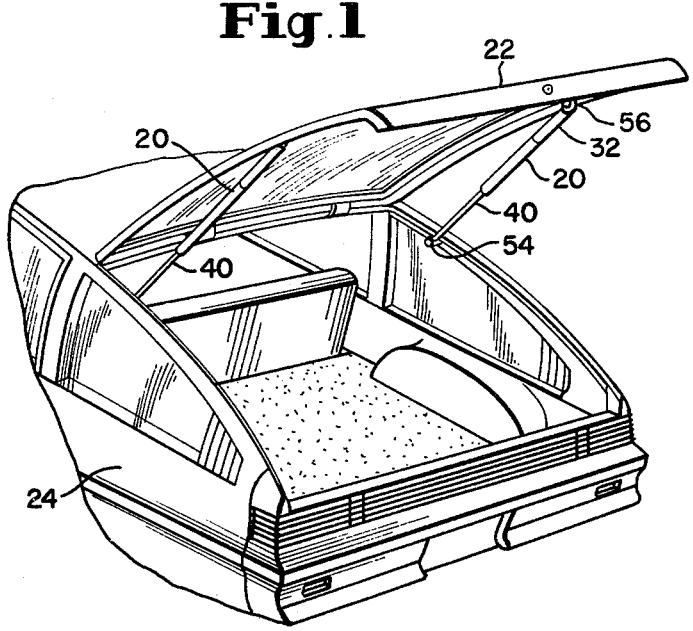
Fig.1
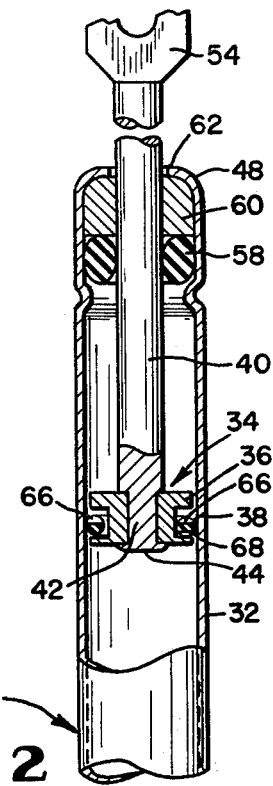
Fig.2
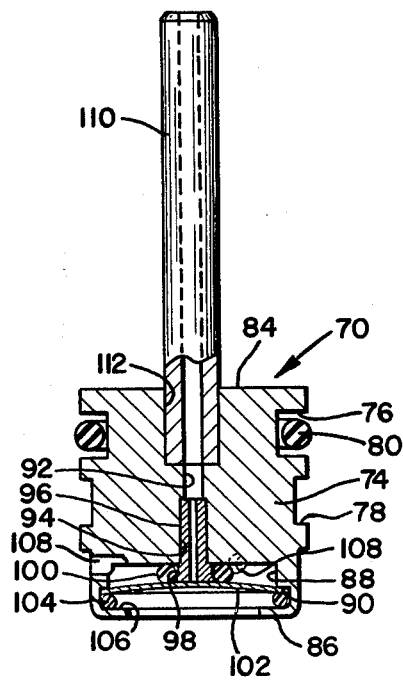
Fig.3
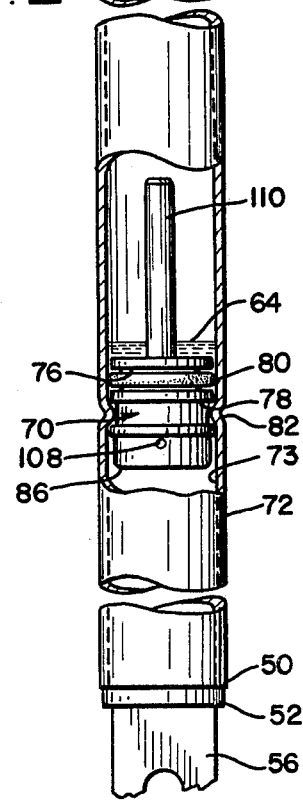

MULTI-CHAMBER TEMPERATURE COMPENSATED PNEUMATIC COUNTERBALANCE

BACKGROUND OF THE INVENTION

Articles known as pneumatic or gas springs, which for convenience can be referred to as counterbalance links are becoming more and more common in commercial articles, particularly in the automotive industry, but they are being used in many other fields wherever the need is present to provide a counterbalance force for closure units, such as lids, doors and cabinet fronts, and gas spring replacement for mechanical spring fittings is becoming prevalent. In some fields of use, such as automotive, the range of change of the surrounding temperature can be substantial. When the temperature drops, the pressure of the gas within the spring unit drops and concurrently therewith the force holding the piston rod extended or in the hold-open position must drop, and often drops below that required to hold the closure member (hatchback) in an open position. Conversely, at higher temperatures the force is often too high. To counter these disadvantages, the industry has evidenced a desire to have pneumatic springs which in some manner will have their output force compensated for temperature changes.

Insofar as applicants are aware, there has been no previously known structure pertaining to the present pneumatic spring invention with its temperature compensation features. These are prior art shock absorbers using liquid which have temperature compensating aspects but most function on pressure changes due to viscosity changes of the liquid under various temperature conditions, and examples are seen in the following U.S. Patents: Pat. No. 1,797,799 to L. W. Shutts for Shock Absorber; Pat. No. 2,301,318 to R. F. Peo for Thermostatic Bypass Valve; Pat. No. 3,674,120 to R. S. Johnson for Auxiliary Shock Absorber Damping Valves; and a German Published Application No. 2,051,858, dated May 25, 1972 to R. Gabler for Hydraulic Telescopic Damper. U.S. Pat. No. 3,147,967 to A. Bougeard for Pneumatic Shock Absorber and U.S. Pat. No. 3,444,830 to H. P. Doetsch for an Adjustable Gas Spring Supported Drawing Table show compensation between two chambers but neither of these patents teach temperature compensation in the pneumatic devices.

SUMMARY OF THE INVENTION

A primary object of the present invention resides in the provision of a unique pneumatic spring counterbalance link including structure providing temperature compensation of the output force responsive to changes in ambient temperature.

In conjunction with the preceding object, further objects reside in such a temperature compensated pneumatic spring of the piston-cylinder kind in which the output force is modified by a variable gas volume for the link in which the variation in volume is accommodated by one or more auxiliary gas chambers in fluid communication with the expansible piston chamber via temperature responsive valve devices. Further novel objects reside in use of bushing valves, with bi-metal valve discs, between the chambers in which flow is permitted in one direction at all temperatures and free flow in both directions is permitted only when the temperature falls below a predetermined value.

Still further objects reside in the novel provision of a temperature compensated pneumatic counterbalance spring link which has a cylinder, a piston rod and piston operably disposed in the cylinder, the rod projecting from one end of the cylinder and wherein the space between the piston and the other closed end of the cylinder includes at least one fixed partition wall device dividing the space into a variable volume piston operating space and at least one fixed volume space, the wall including a temperature responsive valve enabling free gas flow in a direction away from the piston space and permitting gas flow in the opposite direction when temperature of the spring link falls below a predetermined value. In conjunction with this object, further objects reside in the use of a bi-metallic disc as the valve closure member in the temperature responsive valve as well as in such a pneumatic spring link which includes at least two partition wall devices spaced apart and providing at least two adjacent fixed volume spaces, one space being adjacent the variable volume piston space and the second space being between the one fixed volume space and the closed end of said cylinder and each wall device having a temperature responsive valve, with the temperature value to which the valve in the one wall is responsive being a higher value than the temperature value to which the valve of the second wall is responsive.

Further objects reside in providing a novel subcombination unit which can be incorporated as a component in the construction of known pneumatic springs as a wall unit dividing the pneumatic spring cylinder into two volume spaces one being the expansible piston chamber and a second located beyond the retracted location of the piston and the wall unit including a temperature responsive valve permitting essentially free fluid flow past the wall into the second volume space and permitting gas flow in the opposite direction when temperature drops to and below a predetermined value. In this connection the valved wall is constructed as a bushing having external peripheral grooves one of which carries an O-ring seal to seal the bushing to the interior of the spring cylinder and another of which receives an annular bead rolled into the cylinder after the bushing is pre-located in the cylinder to fix the bushing in place as a partition wall, the bushing having a through valve controlled passage having a bi-metallic disc valve with an O-ring valve seat wherein fluid flow will be permitted to pass the valve in one direction at all temperatures and to pass the valve in the opposite direction only when the bi-metallic disc responds to temperature dropping to a predetermined value to open free flow through the passage. The through passage in the bushing may include an orifice for bleed controlled flow of the gas to and from the valve closure member.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings, in which:

FIG. 1, is a partial perspective view of the hatchback portion of an automobile depicting one example of the use of the pneumatic counterbalance encompassed by the present invention;

FIG. 2, is a vertical plan view, partially sectioned, and partially broken away to show details of the temperature compensating pneumatic counterbalance of the present invention;

FIG. 3, is an enlarged cross-section along the axis of the bi-metallic disc temperature compensating bushing assembly which is a subcomponent of the structure shown in FIG. 2;

GENERAL DESCRIPTION

Figure 4:
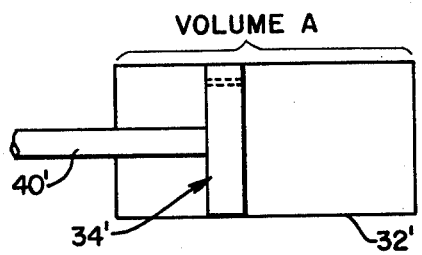
FIG 4, is a schematic representation of prior art pneumatic counterbalance structure.

The present temperature compensated pneumatic counterbalance link invention can be incorporated into pneumatic springs, the basic components of which can be made in accord with previously known and available pneumatic springs. For purposes of illustration the counterbalance unit shown in FIG. 2 uses a cylinder, a piston with orifice by-pass and rod and a piston rod seal and retaining assembly within a cylinder similar to that disclosed and described in U.S. patent application Ser. No. 122,850 filed Feb. 20, 1980, to which reference may be made if necessary.

A representative use of two of the counterbalance units 20 is shown in FIG. 1 where the hatchback 22 of an automobile 24 is shown hinged at the upper edge and supported in the open condition by an extended counterbalance unit 20 on each side of the hatchback.

FIG. 2 shows a representative embodiment of the counterbalance link 20 having a cylinder 32 whose length will be determined by the kind of equipment with which the unit is used. Within the cylinder is a piston assembly 34 which reciprocates in the upper portion of the cylinder, separating that working portion into two compartments which are filled with gas (e.g., air, nitrogen or some other inert gas) under pressure. The piston assembly includes a free fitting piston 36, a piston ring 38 and the piston rod or shaft 40 secured at one end 42 to the piston 36 as by swaging over or riveting the end at 44. These pneumatic counterbalance units, particularly in automotive installations are often pressurized up to around 2000 psi gas pressure. Pressures can be higher or lower depending on the installation. A counterbalance unit with a piston rod having approximately 0.10 inch$^2$ cross-section area will provide a 5 pound extension force when the cylinder is pressurized at approximately 50 psi, and a 200 pound force when pressurized at 2000 psi.

The piston shaft 40 projects out through one end 48 of cylinder 32, the other end 50 of which is closed, as by welding a disc 52 thereto. The projected end of shaft 40 has a connector link 54 rigidly secured thereto, as by screw threads or welding, and a second connector link 56 is secured to the cylinder closed end 50, as by screw threads or welding. Within the cylinder, shaft 40 passes through a large O-ring seal 58 and a shaped bushing 60 which as a free close-fit around the shaft 40 and within cylinder 32. With the open cylinder end 48 crimped at 62 the bushing 60 and the O-ring seal 58 are maintained in assembly. Internal gas pressure keeps the seal 58 and bushing 60 in the end position against the crimped end of cylinder 32. As shown in FIG. 2, a predetermined small quantity of oil 64, e.g., 3–4 cc is placed into cylinder 32 on top of a partition wall bushing unit 70, to be more fully described hereinafter, prior to completion of assembly. The oil provides lubrication for the piston ring and the large O-ring seal 58.

Suitable materials for the various components can be mandrel drawn hydraulic steel tubing for the cylinder, sheet steel for the end disc, the piston shaft is hardened, chrome plated steel, the bushing can be made from, e.g., aluminum or steel, the O-ring is elastomeric, e.g. rubber or plastic, and the piston can be made from, e.g., aluminum. As is to be understood, the piston and ring components as well as the rod seal and bushing can be made in other known configurations and from various other materials depending upon the configuration or modification of design. The piston and its ring, as are true of pneumatic springs, are constructed to provide controlled by-pass flow of gas from one side of the piston to the other side. In most applications, there is a relatively free flow by-pass provided during the retraction or compression stroke and an "orifice" metered flow of gas past the piston during the extension or expansion stroke.

The specific exemplary piston assembly 34 and the rod seal and bushing depicted in FIG. 2 are described in detail in the aforementioned copending application Ser. No. 122,850 and will not be described herein in detail. Sufficient to state, the diameter of the piston is predetermined to provide sufficient clearance from the cylinder wall to enable unrestricted gas flow through the annular space. The piston O-ring 38 will have an inner diameter sufficiently larger than the base diameter of the piston groove, and will be provided with several slots 66 on one side slightly less than ½ diameter deep, to enable free flow by-pass openings for gas to flow across the piston 36 when being moved in a retraction operation. On the other side of the O-ring is a single, formed (preferably pre-molded) orifice groove 68 which serves to provide orifice metered flow during the expansion stroke.

The unique concept of temperature compensation involves using a temperature responsive valve device to separate that portion of cylinder 32, within which the piston reciprocates, from an adjacent chamber 73 containing an additional volume of gas. In FIG. 2 the temperature responsive valve device is the partition wall bushing unit 70 (hereinafter designated a bushing valve for convenience) which is fixed in a predetermined location inside of the spring cylinder 32 which is made with an extended length 72 to provide the aforementioned adjacent gas chamber 73.

Bushing valve 70 is preferably made as shown in FIG. 3 and consists of a bushing 74 constructed with external annular grooves 76 and 78, groove 76 receiving an O-ring seal 80 and groove 78 serving as a means to provide cooperation with an annular bead 82 (see FIG. 2) rolled into the wall of cylinder 32 to lock against and fix the bushing valve unit 70 in a predetermined stationary location within the spring cylinder.

Bushing 74 has two ends, one of which 84 is essentially flat and faces the piston chamber while the other end, which faces away from the piston chamber has a thin annular flange 86 surrounding an annular recess 88 inside of an annular step 90. An axial passage 92 extends through the bushing 74, opening through end face 84 and, via a counterbore 94, into the center of the recess 88. A small orifice unit 96 to provide flow through passage 92 is spigotted into counterbore 94 at the recess 88. This unit 96 provides a projecting chamfered flange portion 98 to locate and retain a small O-ring 100, as a valve seat, against the base of recess 88. Alternatively, the orifice unit 96 could be omitted and the projecting O-ring retainer flange portion 98 can be a machined integral portion of the bushing coaxially within the recess 88. A bi-metallic, temperature responsive disc 102 is disposed within the annular thin flange 86 against the step 90 and will normally be shaped with a convex surface engaging the small O-ring seal 100 to provide the valve closure. A large O-ring seal 104 against the outer periphery of the bi-metallic disc 102 maintains the disc in assembly and is retained in sealed relationship thereagainst by a inturned lip 106 of the thin flange 86. This lip can be made by rolling after assembly of the orifice 96, the O-ring seal 100, the bi-metallic disc 102 and the large O-ring seal 104. In the radial wall of recess 88 between the disc 102 and the orifice O-ring seal 100 a plurality of holes (three being used in the illustrated embodiment) are provided for free flow of gas into and out from the recess 88.

When temperatures are above a predetermined value, the disc 102 will be bowed into engagement with the O-ring 100 and prevents gas flow from the auxiliary chamber 73 (FIG. 2) into the piston chamber. When the temperature value falls to the predetermined value, disc 102 will snap in the opposite bowed condition away from engagement with the O-ring seal 100 to permit fluid flow communication through holes 108 and orifice 96 between the two adjacent chambers, i.e., the effective volume of the spring is increased at the lower temperature.

Figure 6:
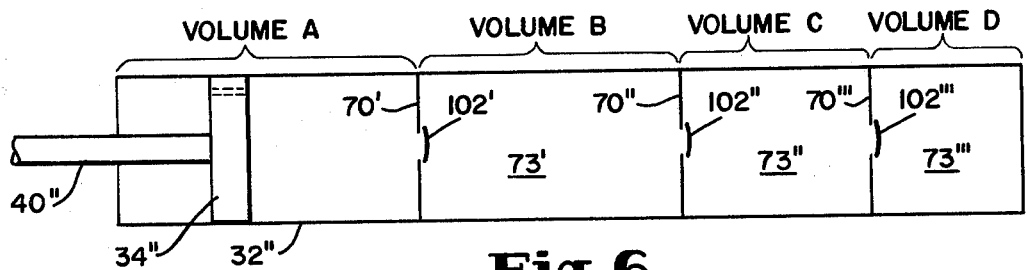
FIG. 6 is a further schematic representation of a different embodiment of the temperature compensated pneumatic counterbalance which incorporates a cylinder divided into four chambers and wherein each chamber is sequentially placed into fluid communication with the next higher chamber by temperature responsive valve units opening at progressively lower temperatures.

The aforedescribed construction of a bushing valve 70 can be used as each partition wall valve unit in dual and plural chamber temperature compensated pneumatic springs as schematically depicted in FIG. 6, however, because a small volume of oil (see FIG. 2) is placed in the piston operated chamber and the spring unit tilts between the extended position shown in FIG. 1 and a opposite position when retracted, e.g. represented by FIG. 2, a means must be provided to prevent the oil from entering the bushing passage 92 and passing into the adjacent chamber 73. Seal ring 80 prevents passage of gas and oil around the outer periphery of the bushing valve 70 and a small tubular stinger 110 spigotted into a counterbore 112 extends the passage 92 through bushing face 84. Stinger tube 110 will prevent the small quantity of oil in the piston operating chamber from communication with the axial passage through the bushing. As the spring unit tilts back and forth during operation, the oil will run along the wall but can never enter the extended end of stinger 110.

Shown in FIG. 2, bushing valve 70 as a subassembly is placed into a subassembly of an open-ended cylinder 32 having its bottom end 50 closed by the disc 52. At the desired location in the cylinder subassembly, with the bushing valve 70 accurately axially located, a bead 82 will be rolled into the cylinder wall, cooperating with the bushing groove 78 and thereby securely fixing the bushing valve 70 in the desired location. Subsequently, the cylinder is pressurized before or after the piston, rod, end seal and bushing are inserted and the open end of the cylinder turned or crimped over to complete the assembly.

When a plural number of auxiliary chambers are utilized, as schematically represented in FIG. 6, each of the bushing valves 70', and 70'' and 70''' are prelocated as subassemblies in a cylinder. Beads, as at 82 in FIG. 2, are rolled into the cooperating grooves in each bushing valve to fix each one at a predetermined location in the cylinder. Final complete assembly, with pressurization, can then be accomplished, as briefly described above for FIG. 2. Note, in the plural chamber embodiments (see FIG. 6), the stinger tube 110 can be used on the first bushing valve 70; but can be deleted from each of the successive bushing valves 70'' and 70''' between chambers in which no oil is placed. Otherwise the bushing valve construction will be the same as described with respect to FIG. 3 excepting that each bi-metal disc 102', 102'', 102''' will be responsive to a differing and successively lower temperature value.

In this temperature compensated pneumatic spring, the additional volume of gas which is utilized at lower temperature, in accordance with the described structure, is provided by increasing the length of the cylinder 32 but not the length of the piston stroke. As well understood in the pneumatic spring counterbalance art, the dimensional values of the extended and retracted linkage, the diameters of the cylinder, piston and rod, and the pressure value of the gas within the specific spring will be dictated by the specific job for which the link is intended and will be so designed. Using higher gas pressures and different kinematics of linkage installation, the spring link can be designed for longer or shorter lengths for specific installations.

Figure 4A:
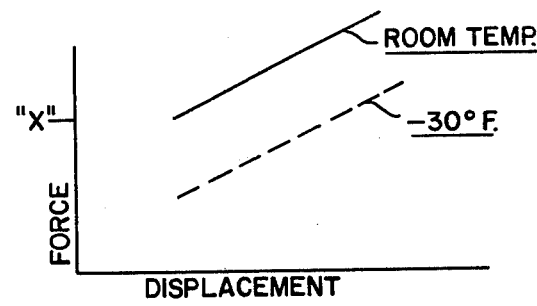
FIG. 4a is a chart illustrating the basic force-displacement curve, at high and low temperatures, for the counterbalance of FIG. 4.
Figure 5:
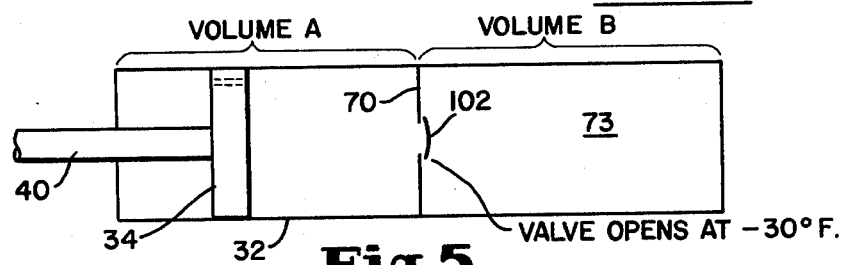
FIG. 5, is a schematic representation of the temperature compensated pneumatic counterbalance of this invention with two chambers, as shown in FIG. 2.
Figure 5A:
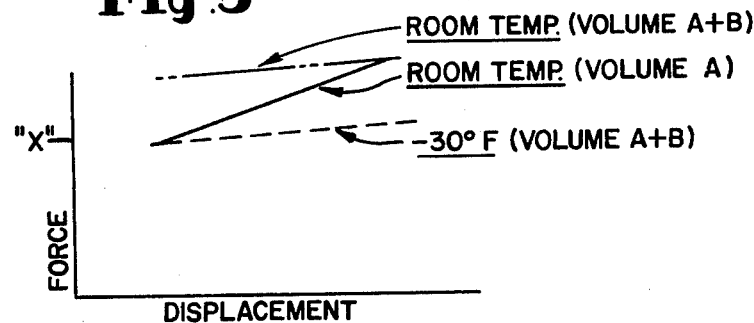
FIG. 5a is a chart illustrating the change of slope of the force-displacement curve when the cylinder working volume is increased.
Figure 6A:
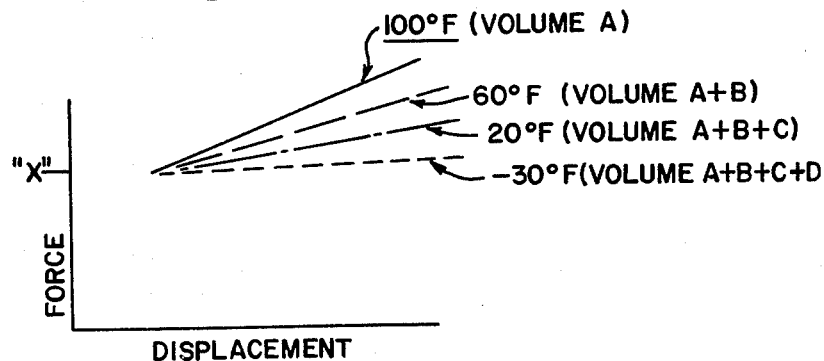
FIG. 6a is a chart illustrating the progressive change of slope of the force-displacement curve as the cylinder working volume is progressively increased in response to progressively lower temperatures providing a relatively constant predetermined hold open output force over a wide range of temperature.

FIGS 4, 5 and 6 and the correlated general slope charts of FIGS. 4a, 5a and 6a provide an explanation of the temperature compensation function which occurs when the gas volume existing in the one or more auxiliary chambers is placed in fluid communication with the expansible portion of the chamber in which the piston reciprocates.

FIG. 4 schematically represents a prior art pneumatic spring with cylinder 32', piston 34' and rod 40' and in which the volume of the expansible chamber is A. At a constant temperature, when piston 34' and its rods 40' are moved to a retracted condition, the space for gas or its volume decreases and the pressure then must increase. The charts are depicted as a general representation of the slope of the pressure-volume relationship expressed in terms of output force (pressure) and piston displacement (volume). The desired output force at the extended condition of the piston is represented by "X". The unit is designed so the pV slope at room or normal ambient temperature will be that represented by the solid line in FIG. 4a. When the temperature drops, e.g., to −30° F. the pressure of the gas in the cylinder decreases but the expansible chamber volume remains the same so, while the pV line has essentially the same slope characteristics it is displaced to lower force or pressure values falling below the desired "X" force. Consequently, the pneumatic spring, in its hold-open condition, cannot exert the desired output force "X", e.g., to keep a hatchback in the raised position.

Turning to FIG. 5, the left hand portion represents a pneumatic spring essentially identical to the FIG. 4 representation with a piston 34, rod 40 and cylinder 32 and with the same volume A as in FIG. 4. However, the cylinder is made longer so it has an additional auxiliary chamber 73 with added volume B, the two chambers being separated by bi-metal disc bushing valve 70, which is designed to open at a predetermined temperature value (example −30° F.). The stroke or displacement of the piston 34 is the same as in FIG. 4 and, during room or ambient temperature, the pV slope, the heavy black line in FIG. 5a, is the same as that in FIG. 4a and provides the desired output force "X" in the hold-open condition. The desired force "X" at −30° F. can be achieved by an increase in volume of gas. If one increases the volume of gas in the spring by volume B, the pV slope is raised and becomes flatter. As shown in FIG. 5a, at room temperature, the force (upper phantom line) would now exceed the desired "X" force, if the volume of gas were A & B so the gas volume B is not used until the temperature drops to the predetermined value (−30° F.) whereupon the bi-metal disc 102 opens valve 70 and the pV slope of A plug B is at the pressure values shown by the dashed line in FIG. 5a, whereat the hold open force closely approximates the desired value of "X". When the temperature rises past the predetermined value the bi-metal disc 102 closes valve 70 and the working volume reduces to A. Note, with valve 70 closed, gas can flow into but not out from chamber 73. Retraction displacement of the piston will cause gas flow past the bushing valve 70 to cause equalized pressures in the piston chamber and the auxiliary chamber 73, whenever the pressure of gas in the piston chamber is higher than that in the auxiliary chamber. Thus, during spring operation, the auxiliary chamber will always be charged with gas at the same pressure as the highest pressure that occurs and exists in the expansible chamber.

FIG. 6 is a schematic representation of an embodiment of a temperature compensated pneumatic spring where the cylinder has four chambers, the piston chamber, and successive chambers 73', 73'' and 73'''. Between each pair of adjacent chambers there will be a temperature responsive valve 70', 70'' and 7''' each with its own bi-metal disc 102', 102'' and 102''' responsive to successively lower temperature values. For illustrative purposes discs 102', 102'' and 102''' are respectively responsive at temperatures of 60° F., 20° F. and −30° F. Using more than one auxiliary chamber and with each additional chamber controlled by individual bi-metal valves one can more linearly stabilize the output force regardless of temperature as will be seen on the chart of FIG. 6a. That chart illustrates progressive change of the pV slope of the force-displacement curve as the available cylinder volume is progressively increased in response to progressively lower temperature thereby providing a relatively constant predetermined hold open output force over a wide range of temperature change.

If necessary, to avoid long length dimensions of the gas spring, one or more of the auxiliary chambers and control valves could be incorporated in a parallel cylinder or auxiliary chamber with one end in fluid communication with the conventionally closed end of the pneumatic spring cylinder which contains the piston The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A temperature compensated pneumatic counterbalance spring link comprising: a gas-charged cylinder with a cylinder wall having two ends; a piston rod and attached piston operably disposed in said cylinder intermediate said two ends with said rod projecting from one end of the cylinder; retaining means and seal means around said rod and maintained in said one end of the cylinder; the portion of said cylinder between the piston and the other end of said cylinder constituting a space and including at least one fixed partition wall means included in said space having means providing a fluid seal with said cylinder and dividing said space into a variable volume piston operating space and at least one auxiliary volume space; said wall means including temperature responsive valve means enabling substantially free gas flow in a direction away from the piston space and preventing gas flow in the opposite direction except when temperature to which the spring link is normally subjected falls below a predetermined value.

2. A pneumatic spring link as defined in claim 1, including at least two, a first and a second, of said partition wall means, said two wall means being spaced apart and providing at least two adjacent auxiliary volume spaces, one space being adjacent the variable volume piston space and separated therefrom by said first wall means and a second auxiliary space being between said one auxiliary space and the opposite end of said cylinder and separated from the first auxiliary space by said second wall means; each wall means having a said temperature responsive valve means, and the predetermined temperature value to which said valve means in said first wall means is responsive being a higher value than the predetermined temperature value to which said valve means of said second wall means is responsive.

3. A pneumatic spring link as defined in claim 1, including a plurality of said partition wall means, each of which wall means is spaced apart from the adjacent wall means, providing a plurality of auxiliary volume spaces between the variable volume piston space and the opposite end of said cylinder; each of said wall means including a said temperature responsive valve means; the values of predetermined temperature to which said valve means are responsive being progressively lower, in each valve means, starting from the one closest to the variable volume piston space.

4. A pneumatic spring link as defined in claim 1, 2 or 3, wherein the value of temperature, to which at least the valve means in the wall means next to the variable volume piston space is responsive, is higher than the temperature to which the spring link is normally subjected.

5. A pneumatic counterbalance spring link as defined in claim 4 wherein the value of temperature, to which at least the valve means in the wall means farthest from the variable volume piston space is responsive, is lower than the temperature to which the spring link is normally subjected.

6. A pneumatic spring link as defined in claim 1, 2 or 3 wherein the value of temperature, to which each said temperature controlled valve means is responsive, is progressively lower, than the temperature to which the spring link is normally subjected, as the specific valve means are disposed closer to the opposite end of the cylinder.

7. A pneumatic spring link as defined in claim 1, 2 or 3 wherein the value of temperature, to which each of said temperature controlled valve means is responsive, is progressively higher than the temperature to which the spring link is normally subjected as the specific valve means are disposed closer to the variable volume piston space.

8. A pneumatic spring link as defined in claim 1, 2 or 3 wherein a predetermined small quantity of oil is in the variable volume piston space and said fixed wall means adjacent said variable volume piston space includes means preventing said oil from entering any said auxiliary volume space.

9. A pneumatic spring link as defined in claim 1, 2 or 3 wherein each said fixed wall means comprises: a bushing with two ends fixed in and sealed against the cylinder wall with fluid communication passage means provided through said bushing; and said temperature responsive valve means controls flow through said fluid communication passage means and is carried in one end of said bushing.

10. A pneumatic spring link as defined in claim 9 wherein said fluid communication passage means in each fixed wall means includes an orifice passage.

11. A pneumatic spring link as defined in claim 9 wherein each said temperature responsive valve means includes a bi-metal disc valve closure and an O-ring seat surrounding said one end of the fluid communication means and facing the closed end of the cylinder, means on said bushing maintaining said disc and said O-ring seat in valving assembly in said bushing.

12. A pneumatic spring link as defined in claim 11, wherein a predetermined small quantity of oil is in the variable volume piston space and said fixed wall means adjacent said variable volume piston space includes means preventing said oil from entering the fluid communication passage means and from passing said wall means.

13. A pneumatic spring link as defined in claim 12, wherein said means preventing oil from entering the fluid communication passage means is an elongated tube fixed in the end of the bushing facing the variable volume piston space and providing a projected flow passage extension from the fluid communication passage means into the variable volume piston space.

14. A temperature compensated pneumatic spring link as defined in claim 1, wherein said wall means comprises: a cylindrical valve body with flow ports at each end of said body; a countersunk coaxial recess in one end of said body; passage means extending from the other end of said body through and coaxial with said body opening into the base of said recess and including one of said flow ports; a O-ring valve seat seated in and against the bottom of said recess coaxial with the passage means; a valve closure and operator means comprising a bowed bi-metallic temperature responsive disc of greater diameter than said O-ring valve seat, being responsive to a predetermined temperature condition to snap over to the opposite bowed contour located in said recess so that a convex surface of said disc, when bowed in one direction, engages and seats against said O-ring valve seat; means at said recess end of said body maintaining said disc, with freedom to snap, within said recess into and away from engagement with said O-ring valve seat; said body having at least one of said flow ports at the recess end of the body providing fluid communication into and from a part of said recess radially outward of said O-ring valve seat and between said disc and the bottom of said recess; whereby said valve acts as a check valve permitting essentially free fluid flow in one direction at any temperature and permitting free fluid flow in the opposite direction only when said disc has snapped to its bowed contour out of engagement with said O-ring valve seat.

15. A temperature compensated pneumatic spring link as defined in claim 14 wherein said recess includes a small tubular spigot means protruding from the recess base and aligned with said passage and said O-ring valve seat fits on and is retained in operative position by said spigot means.

16. A temperature compensated pneumatic spring link as defined in claim 15, wherein said spigot means is slightly undercut to provide a flared retainer over which said O-ring valve seat is fitted and maintained in seated condition against the bottom of said recess.

17. A pneumatic spring link comprising: a cylinder assembly comprising a cylinder with a cylinder wall and a closed end; a piston assembly reciprocable within said cylinder, in a portion thereof constituting a variable volume piston space, with a piston shaft extending from the other end of said cylinder, a bushing on said shaft, an annular seal means around said shaft, piston means fixed on the end of said shaft; the other end of said cylinder having means to retain said bushing within said cylinder; said seal means providing a static seal against said cylinder, and a dynamic seal around said shaft; said piston means including means enabling metered orifice by-pass flow of gas across said piston during the stroke in one direction and a free flow by-pass fluid communication path across said piston during the stroke in the opposite direction; said cylinder including, between said piston and said closed end, at least one sealed partition wall means spaced-apart from said closed end, and fixed against axial movement in said cylinder to provide an auxiliary volume space; said partition wall means including a temperature controlled valve means permitting free gas flow in one direction from the variable volume space on the piston side of said wall means to the auxiliary volume space on the other side of said wall means and preventing gas flow in the other direction except when the spring link temperature falls below a predetermined value; a predetermined small quantity of oil being contained in the variable volume space of said cylinder; and a predetermined quantity of gas under pressure being contained within said cylinder.

18. A pneumatic spring link as defined in claim 17, including a plurality of said partition wall means, each of which is spaced apart from the adjacent one and providing a plurality of auxiliary volume spaces between the variable volume piston space and the closed end of said cylinder; each of said wall means including a said temperature controlled valve means; the values of temperature to which said valve means are responsive being progressively lower, in each valve means, sequentially spaced from the one closest to the variable volume piston space.

19. A pneumatic spring link as defined in claim 17 or 18, wherein each said fixed wall means comprises: a bushing fixed in said cylinder and sealed against said cylinder wall with fluid communication passage means provided through said bushing; and said temperature responsive control valve means controls flow through said fluid communication passage means and is carried by said bushing.

20. A pneumatic spring link as defined in claim 19, wherein said fluid communication passage means in each said fixed wall means includes an orifice passage.

21. A pneumatic spring link as defined in claim 19, wherein each said temperature responsive valve means includes a bi-metal disc valve closure and an O-ring seat surrounding the end of the fluid communication passage means facing the closed end of the cylinder, means in said bushing maintaining said disc and said O-ring seat in valving assembly in said bushing.

22. A pneumatic spring link as defined in claim 21, wherein said fixed wall means adjacent said variable volume piston space includes means preventing said oil from entering the fluid communication passage means and from passing said wall means.

23. A pneumatic spring link as defined in claim 22, wherein said means preventing oil from entering the fluid communication passage means comprises an elongated tube fixed in the end of the bushing facing the variable volume piston space and providing a projected flow passage extension from the fluid communication passage means into the variable volume space.

24. A pneumatic spring link comprising: a differential expansible chamber assembly with an enclosure wall; a movable differential area wall assembly which can move in two directions in and dividing said expansible chamber assembly into large and small cross-section area chambers, with a movable force output link extending from said movable wall assembly to the exterior of said expansible chamber assembly; a bushing and seal means around said link where it projects through the enclosure wall of the expansible chamber; said seal means providing a static seal with said chamber and a dynamic seal relative to said link; said movable wall assembly including means enabling flow of fluid across the wall assembly during movement in both directions; said chamber assembly including, as part of the large area chamber, at least one sealed fixed wall means functionally and structurally dividing the chamber into a portion of the expansible chamber and at least one auxiliary volume chamber; said fixed wall means including a temperature controlled valve means permitting free gas flow in one direction between the expansible chamber and the auxiliary volume chamber on the other side of said fixed wall means and preventing gas flow in the other direction except when the spring link temperature reaches a predetermined value; and a predetermined quantity of gas under pressure being contained in said chambers.

25. A pneumatic spring link as defined in claim 24, wherein said wall means comprises: a cylindrical valve body with flow ports at each end of said body; a countersunk coaxial recess in one end of said body; passage means extending from the other end of said body through and coaxial with said body opening into the base of said recess and including one of said flow ports; a O-ring valve seat seated in and against the bottom of said recess coaxial with the passage means; a valve closure and operator means comprising a bowed bi-metallic temperature responsive disc of greater diameter than said O-ring valve seat, being responsive to a predetermined temperature condition to snap over to the opposite bowed contour located in said recess so that a convex surface of said disc, when bowed in one direction, engages and seats against said O-ring valve seat; means at said recess end of said body maintaining said disc, with freedom to snap, within said recess into and away from engagement with said O-ring valve seat; said body having at least one of said flow ports at the recess end of the body providing fluid communication into and from a part of said recess radially outward of said O-ring valve seat and between said disc and the bottom of said recess; whereby said valve acts as a check valve permitting essentially free fluid flow in one direction at any temperature and permitting free fluid flow in the opposite direction only when said disc has snapped to its bowed contour out of engagement with said O-ring valve seat.

26. A pneumatic spring link as defined in claim 25, wherein said recess includes a small tubular spigot means protruding from the recess base and aligned with said passage and said O-ring valve seat fits on and is retained in operative position by said spigot means.

27. A pneumatic spring link as defined in claim 26, wherein said spigot means is slightly undercut to provide a flared retainer over which said O-ring valve seat is fitted and maintained in seated condition against the bottom of said recess.

28. A temperature compensated pneumatic counterbalance spring link comprising: a gas-charged chamber means including a cylinder; a piston rod and attached piston operably reciprocably disposed in said cylinder with said rod projecting from one end of the cylinder; retaining means and seal means around said rod and maintained in said one end of the cylinder; the space in said cylinder between the piston and the other end of said cylinder including at least one fixed partition wall means having means providing a fluid seal with said cylinder and dividing said chamber means into a variable volume piston operating space in said cylinder and at least one auxiliary volume space; said wall means including temperature responsive valve means enabling substantially free gas flow in one direction and preventing gas flow in the opposite direction except when the spring link temperature reaches a predetermined value.

29. A pneumatic spring link as defined in claim 28, including at least a first and a second of said partition wall means, said first and second wall means being spaced apart in said chamber means and providing at least two adjacent auxiliary volume spaces one space being adjacent and between the variable volume piston space and the second auxiliary space; each said wall means having a said temperature responsive valve means, and the predetermined temperature value to which said valve means in said first wall means is responsive being a higher value than the predetermined temperature value to which said valve means of said second wall means is responsive.

30. A pneumatic spring link as defined in claim 28, including a plurality of said partition wall means, each of which is spaced apart from the adjacent one and providing a plurality of auxiliary volume spaces located seriatim from adjacent the variable volume piston space; each of said wall means including a said temperature responsive valve means; the values of temperature to which said valve means are responsive being progressively lower, in each valve means sequentially spaced from the one closest to the variable volume piston space.

31. A pneumatic spring link as defined in claim 28, 29 or 30, wherein the value of temperature, to which at least the valve menas in the wall means next to the variable volume piston space is responsive, is higher than the temperature to which the spring link is normally subjected.

32. For use in combination with a piston cylinder type of pneumatic spring counterbalance, a subcombination unit to be fixed at a predetermined location in the spring cylinder, comprising: a wall means having two opposite sides and which, when fixed in the cylinder, is adapted to divide the pneumatic spring cylinder into separate volume spaces, one spacebeing the expansible piston chamber space and a second space being located beyond the limit position of the retracted condition location of the piston, said wall means including a through passage from one side of the wall to adjacent it other side having temperature responsive valve means permitting essentially free fluid flow through said passage in one direction at any temperature and preventing fluid flow in the opposite direction except when temperature, to which the wall means is subjected, reaches a predetermined value.

33. A temperature responsive valved wall means as defined in claim 32, comprising: a bushing with two ends including said valve controlled through passage axially disposed through said bushing and plural external peripheral grooves in the bushing periphery between its said ends; an O-ring seal in one of said grooves to adapt the bushing to be sealed to the interior of a gas spring cylinder, and another of which grooves is adapted to receive and coact with an annular bead rolled into the cylindrical wall of the spring cylinder after the bushing is prelocated in the cylinder in order that the bushing can be fixed in place as a cylinder space partition wall; the bushing through passage including, at one of the ends of said bushing, a temperature responsive bi-metallic disc valve closure with an O-ring valve seat aligned with said bushing through passage whereby fluid flow will be permitted through the wall passage in one direction at all temperatures and through said bushing through passage in the opposite direction only when the bi-metallic disc valve closure responds to temperature dropping to a predetermined value to open free flow through the bushing through passage.

34. A wall means as defined in claim 33, further including an elongated tube fixed in the end of the bushing opposite the end which contains the bi-metallic disc valve and providing a projected flow passage extension from the fluid communication passage.

35. A wall means as defined in claim 33 or 34, including an orifice in said bushing through passage.

36. A temperature compensated pneumatic counterbalance spring link comprising: a gas-charged chamber means including a cylinder; a piston rod and attached piston operably reciprocably disposed in said cylinder with said rod projecting from one end of the cylinder; retaining means and seal means around said rod and maintained in said one end of the cylinder; the space in said cylinder between the piston and the other end of said cylinder including at least one fixed partition wall means having means providing a fluid seal with said cylinder and dividing said chamber means into a variable volume piston operating space in said cylinder and at least one auxiliary volume space; said wall means including temperature controlled valve means providing a valve controlled flow path from one side to the other side of said fixed wall means enabling substantially free gas flow in one of the directions and blocking of the flow path and preventing gas flow in the other of the directions excepting when the temperature of the valve means reaches a predetermined value.

* * * * *

UNITED STATES PATENT AND TRADEMARK OFFICE
CERTIFICATE OF CORRECTION

PATENT NO. : 4,408,751
DATED : October 11, 1983
INVENTOR(S) : Daniel P. Dodson and George C. Ludwig It is certified that error appears in the above-identified patent and that said Letters Patent is hereby corrected as shown below:

Column 1, line 32, change "These" to --There--.

Column 4, line 11, change "as" to --has--.

Column 7, line 29, change "plug" to --plus--.

Column 7, line 50, change "7'''" to --70'''--.

Column 13, line 5, (Claim 31) change "menas" to --means--.

Column 13, line 15 (Claim 32) change "spacebeing" to --space being--.

Signed and Sealed this

Third Day of April 1984

[SEAL]

Attest:

Attesting Officer

GERALD J. MOSSINGHOFF

Commissioner of Patents and Trademarks